US009747698B2

(12) United States Patent
Stathis

(10) Patent No.: US 9,747,698 B2
(45) Date of Patent: Aug. 29, 2017

(54) SYSTEM FOR ACCURATELY AND PRECISELY LOCATING AND MARKING A POSITION IN SPACE USING WIRELESS COMMUNICATIONS AND ROBOTICS

(76) Inventor: Sam Stathis, New York, NY (US)

( * ) Notice: Subject to any disclaimer, the term of this patent is extended or adjusted under 35 U.S.C. 154(b) by 983 days.

(21) Appl. No.: 11/875,678

(22) Filed: Oct. 19, 2007

(65) Prior Publication Data

US 2008/0154538 A1 Jun. 26, 2008

Related U.S. Application Data

(60) Provisional application No. 60/862,439, filed on Oct. 21, 2006.

(51) Int. Cl.
*G06T 1/00* (2006.01)
*G06T 7/33* (2017.01)

(52) U.S. Cl.
CPC ...................................... *G06T 7/33* (2017.01)

(58) Field of Classification Search
None
See application file for complete search history.

(56) References Cited

U.S. PATENT DOCUMENTS

| | | | |
|---|---|---|---|
| 5,294,970 A | 3/1994 | Dornbusch et al. | |
| 5,751,289 A | 5/1998 | Myers | |
| 5,764,217 A * | 6/1998 | Borrel et al. | 345/156 |
| 6,600,168 B1 | 7/2003 | Geng | |
| 2002/0196250 A1* | 12/2002 | Anderson et al. | 345/420 |
| 2004/0095345 A1 | 5/2004 | Ellenby et al. | |
| 2005/0099637 A1 | 5/2005 | Kacyra et al. | |
| 2006/0221072 A1 | 10/2006 | Se et al. | |
| 2006/0256070 A1* | 11/2006 | Moosavi et al. | 345/104 |

OTHER PUBLICATIONS

Meng et al., "Target Searching using Cooperative Heterogeneous LEGO Robots", Date: Jul. 23-28, 2006, pp. 6 source: International Conference on Engineering Education.*
Dudek et al., "A Taxonomy for Multi-Agent Robotics", Date: 1996, pp. 25, source: NSERC.*

* cited by examiner

*Primary Examiner* — Kee M Tung
*Assistant Examiner* — Jwalant Amin
(74) *Attorney, Agent, or Firm* — Stanley H. Kremen

(57) ABSTRACT

A system comprising a Master station and a substation under the control of the Master station is able to generate graphical drawings of a multidimensional space in real time. Information regarding the physical dimensions of a multidimensional space and location an orientation objects and/or structures therein are exchanged between the stations. The Master station is able to automatically generate an N dimensional graphical representation of the multidimensional space in real time, i.e., as it receives information from the substation and as it obtains information with its own measurement devices. The Master station can display the multidimensional space to a user allowing the user to be guided (i.e., to navigate) within the multidimensional space.

30 Claims, 24 Drawing Sheets

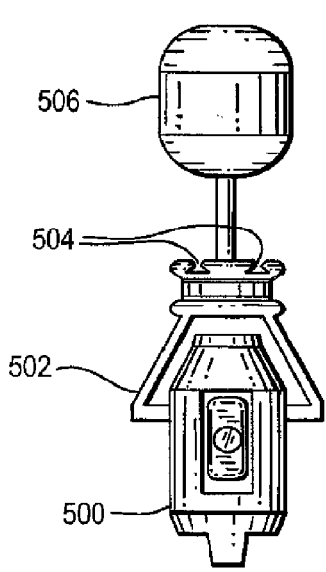
FIG. 15A
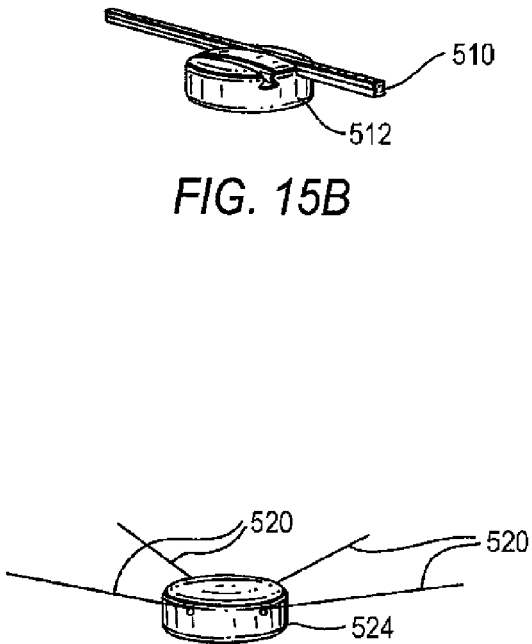
FIG. 15B
FIG. 15C
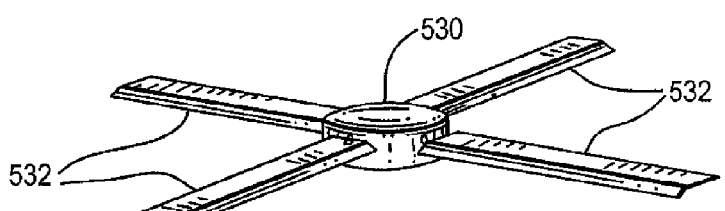
FIG. 15D

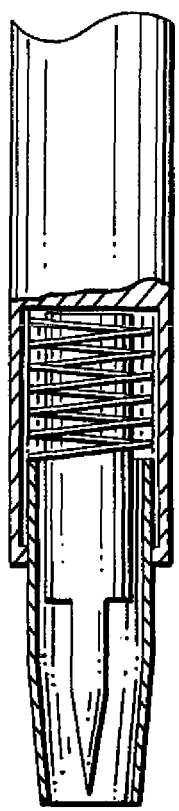
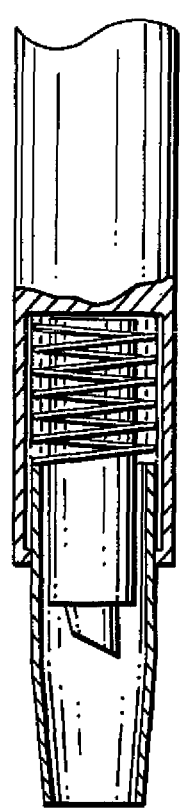
FIG. 17A                    FIG. 17B

SYSTEM FOR ACCURATELY AND PRECISELY LOCATING AND MARKING A POSITION IN SPACE USING WIRELESS COMMUNICATIONS AND ROBOTICS

This application claims the benefit of the filing date of a provisional application having Application No. 60/862,439 titled "System for Accurately and Precisely Locating and Marking a Position in Space Using Wireless Communications and Robotics" filed on Oct. 21, 2006.

FIELD OF THE INVENTION

The present invention relates to a system and method determining specific locations in a multidimensional space.

BACKGROUND OF THE INVENTION

Information obtained from measuring devices in a construction site are documented and then provided to architects and engineers to develop plans and blue prints for the construction site.

SUMMARY OF THE INVENTION

The present invention provides a system comprising a Master station and at least one substation both of which are capable of communicating with each other to locate and identify one or more locations in a multi-dimensional space. The Master station further can control one or more of the substations to perform a particular task within the multidimensional space. The Master station is able to determine its position within the multidimensional space and the location of references, and specified points, objects and/or structures within the multidimensional space to generate an N-dimensional graphical representation of the multidimensional space (where N is an integer equal to 2 or greater) as the space is being studied; i.e., in real time. A user of the system operating the Master station can thus be guided through the multidimensional space.

The Master station comprises a transmitter and receiver equipment used to measure distances and to identify locations of various points within the multidimensional space. The Master station may further comprise a sensor and a processor. The Master station can be transportable, mobile and autonomous through the operation of software providing instructions to the processor. The transmitter and receiver are able to transmit and receive wireless radio signals or optical signals or both. The sensor is capable of detecting optical signals that are (i) transmitted by one or more of the substations, (ii) reflected by one of the substations or (iii) reflected from a structure within the multidimensional space or a fixed reference point within the structure. With the processor and software residing therein and the identification of a plurality of specified reference points, the Master station is able to calculate its position (through the well known process of triangulation, for example) within the multidimensional space, the locations of substations within the multidimensional space and object, structures within the multidimensional space or form the boundaries of the multidimensional space. Points and locations within the multidimensional space measured and identified by the Master station can be transferred onto a two or three dimensional space graphical representation (or generally an N dimensional space where N is an integer equal to 2 or greater) that can be displayed to allow a user operating the Master station of the present invention to determine his or her position within the multidimensional space or navigate (or to be guided) within the space by viewing the graphical representation of the multidimensional space. The graphical representation, in three dimensions for example, can be implemented with the use of software including well known CAD (Computer Aided Design such as AUTOCAD®) software and additional software. As new points, objects, structures are identified and measured, the information is transferred to the Master station which is able to automatically determine the exact location of these points with respect to other objects, structures and boundaries of the multidimensional space allowing it to automatically generate a real time graphical representation of the multi-dimensional space as the space is being studied. The term "automatically" as used herein refers to tasks performed by one or more components of the system of the present invention as directed by firmware or software of the system. A task performed automatically can be done in real time meaning the task is done as information used to perform the task is being received.

A Master station can communicate with one or more substations. A substation may be passive or active. That is, a passive substation may be a device that reflects optical or radio signals from the Master station or from another substation. A passive substation doe not, on its own, transmit information. An active substation may contain a sensor, a transmitter and a receiver to send information to the Master station or to receive information from the Master station in order to perform a command sent by the Master station. Further, a substation may be both a passive and active device; that is, part of the substation reflects signals from another device (another substation or a Master station) and another part of the substation generates or transmits reference point information or any other type of information to a Master station or to another substation. The substation can be transportable, mobile and autonomous through the operation of software residing in a processor of the substation. The substation may be equipped with tools to perform tasks based on command received from the Master station or from another substation relaying a command from the Master station. The Master station may also be equipped with such tools.

BRIEF DESCRIPTION OF THE DRAWINGS

FIGS. 15A-D: show a gyroscopically stabilized, cable driven, rail driven and hover driven computerized transport system for a Master station or a substation;

FIG. 17 shows two particular heads for a robotic arm used as a marking tool;

DETAILED DESCRIPTION

Figure 1A:
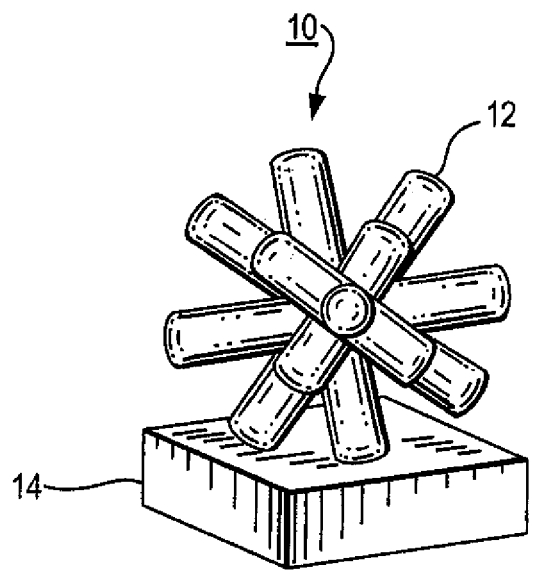
FIGS. 1A-B illustrates a particular accelerometer structure.

The present invention provides a system comprising a Master station and at least one substation both of which are capable of communicating with each other to locate and identify one or more locations in a multi-dimensional space. The Master station further can control one or more of the substations to perform a particular task within the multidimensional space. The Master station is able to determine its position within the multidimensional space and the location of references, and specified points, objects and/or structures within the multidimensional space to generate an N-dimensional graphical representation of the multidimensional space (where N is an integer equal to 2 or greater) as the space is being studied; i.e., in real time. A user of the system operating the Master station can thus be guided through the multidimensional space.

The Master station comprises a transmitter and receiver equipment used to measure distances and to identify locations of various points within the multidimensional space. The Master station may further comprise a sensor and a processor. The Master station can be transportable, mobile and autonomous through the operation of software providing instructions to the processor. The transmitter and receiver are able to transmit and receive wireless radio signals or optical signals or both. The sensor is capable of detecting optical signals that are (i) transmitted by one or more of the substations, (ii) reflected by one of the substations or (iii) reflected from a structure within the multidimensional space or a fixed reference point within the structure. With the processor and software residing therein and the identification of a plurality of specified reference points, the Master station is able to calculate its position (through the well known process of triangulation, for example) within the multidimensional space, the locations of substations within the multidimensional space and object, structures within the multidimensional space or form the boundaries of the multidimensional space. Points and locations within the multidimensional space measured and identified by the Master station can be transferred onto a two or three dimensional space graphical representation (or generally an N dimensional space where N is an integer equal to 2 or greater) that can be displayed to allow a user operating the Master station of the present invention to determine his or her position within the multidimensional space or navigate (or to be guided) within the space by viewing the graphical representation of the multidimensional space. The graphical representation, in three dimensions for example, can be implemented with the use of software including well known CAD (Computer Aided Design such as AUTOCAD®) software and additional software. As new points, objects, structures are identified and measured, the information is transferred to the Master station which is able to automatically determine the exact location of these points with respect to other objects, structures and boundaries of the multidimensional space allowing it to automatically generate a real time graphical representation of the multi-dimensional space as the space is being studied. The term "automatically" as used herein refers to tasks performed by one or more components of the system of the present invention as directed by firmware or software of the system. A task performed automatically can be done in real time meaning the task is done as information used to perform the task is being received.

A Master station can communicate with one or more substations. A substation may be passive or active. That is, a passive substation may be a device that reflects optical or radio signals from the Master station or from another substation. A passive substation doe not, on its own, transmit information. An active substation may contain a sensor, a transmitter and a receiver to send information to the Master station or to receive information from the Master station in order to perform a command sent by the Master station. Further, a substation may be both a passive and active device; that is, part of the substation reflects signals from another device (another substation or a Master station) and another part of the substation generates or transmits reference point information or any other type of information to a Master station or to another substation. The substation can be transportable, mobile and autonomous through the operation of software residing in a processor of the substation. The substation may be equipped with tools to perform tasks based on command received from the Master station or from another substation relaying a command from the Master station. The Master station may also be equipped with such tools.

Figure 1B:
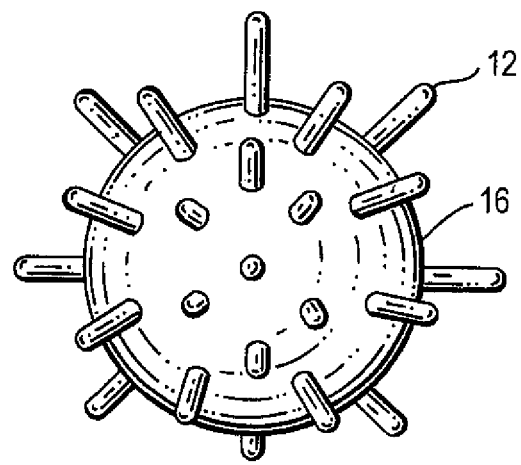

Referring to FIG. 1, there is shown a particular accelerometer configuration. Accelerometers, which are well known devices used to measure distance based on the rate of velocity or acceleration experienced by the accelerometer, can be configured in a substantially spherical configuration and coupled to electronic circuitry to allow the measurement of distance. FIG. 1A shows the orientation of the particular accelerometers and FIG. 1B shows the external appearance of the device. The accelerometer cluster 10 comprises of a plurality of cylindrical shaped accelerometers 12 coupled to a housing 14 containing the proper supporting circuitry and mechanics for the cluster. An outer shell 16 may be configured to mount onto the cluster resulting in a spherical shaped cluster. The accelerometer cluster can be mounted on a vehicular Master station or on a vehicular substation that may be controlled by a Master station. The distance traveled and rate traveled is determined by measuring acceleration values from each accelerometer and computing the resultant of the velocity and distance for all of the accelerometers.

Thus, a more accurate calculation of the distance and velocity traveled by a vehicle on which the accelerometer cluster is mounted can be obtained.

Figure 2:
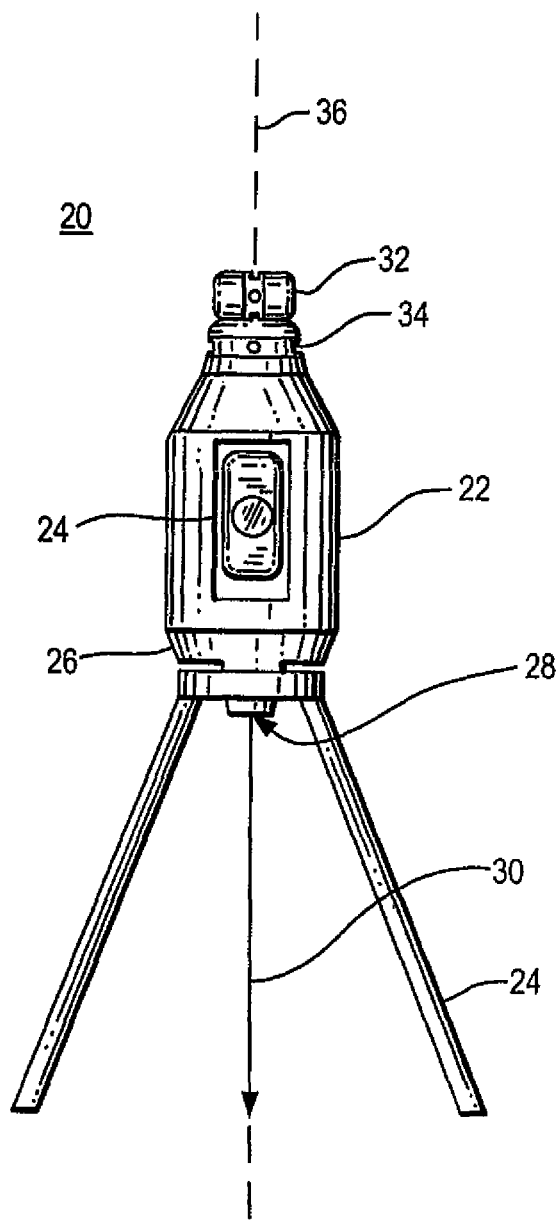
FIG. 2 is a front view of a Master station of the present invention.

FIG. 2 is one embodiment of a Master station of the system of the present invention. The Master station 20 shown in FIG. 2 is a transportable Master station; that is, it can be moved from one location to another by a user. The Master station of FIG. 2 can be a Master station assembly comprising various modules (not shown) such as communications and processor modules. The communication modules may be used to communicate with substations (or other Master stations) located in the same multi-dimensional space in which the Master station assembly is located. The processor module may have residing therein or may be able to control software that can enable the Master station assembly to calculate its location within the multidimensional space and also calculate the location of specific points within the multidimensional space. The processor may be implemented as a wireless laptop or other type of computer that is able to communicate with the Master station to effectuate the marking and/or locating one or more positions in a multi-dimensional space. Part of the Master station can be implemented as a well known device called a Theodolite typically used by surveyors to measure distance to certain reference points and angles within a 3-D space. Shown in FIG. 2 is a Theodolite housing 22 mounted on a tripod 24 (only two legs of the tripod are shown). The Theodolite portion of the Master station has a lens assembly 24 capable of sighting and reading fixed references and can act as a bar code reader or Graphic reader. The Theodolite is a robotic Theodolite where orientation of the housing and the lens can be remotely controlled or can be autonomously controlled by the processor which is controlled by software residing therein. The processor may be part of the Theodolite or may be coupled wirelessly, or through a communications cable by a laptop or desktop computer or other computer/database apparatus. The Master station in FIG. 2 has a distance measuring device able to measure the distance of the housing 22 from the ground or surface on which the station is standing. The Master station of FIG. 2 uses laser technology to perform the height measurement. In particular the Master station of FIG. 2 has an automatic leveling apparatus (e.g., gyroscope) that is disposed within housing bottom 26 and upper portion of tripod 24. The automatic leveling apparatus may be totally disposed within housing 22. The Master station 20 is thus able to perform self leveling with the use of the laser 28, leveling apparatus located in the lower housing 26 and possibly the horizontal and vertical spinning lasers (to be discussed infra) mounted on top of the housing 20. A laser distance meter 28 with associated electronics (not shown) allow the Master station 20 to measure its height above ground or above the surface on which it stands. The laser 28 emits a visible laser beam 30 along the vertical axis 36 of the Master station which is used to measure the distance to the ground or to the base on which the Master station is standing. Mounted on top of housing 22 are a vertical spinning laser 32 and a horizontal spinner laser 34. The lasers can enable automatic, autonomous orientation of the Master station in relation to the space (or CAD or digitized drawings) in which it is placed; this is done by searching for and measuring the distance to any number of fixed reference stations or to other Master stations or substations. It will clearly understood that with respect to the Master station of FIG. 2 and other Master stations and substations described herein that lasers are used to measure distance from a point by transmitting a laser beam (continuous or pulsed or a combination of the two) to that point and measure characteristics of the resulting reflected beam to calculate the distance to that point.

Figure 3A:
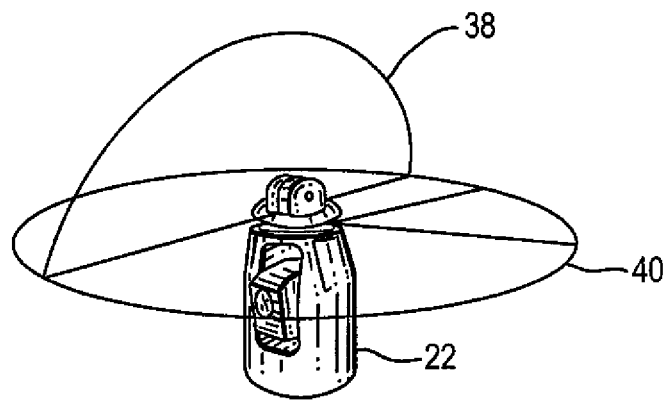
FIGS. 3A-B is a front view of a Master station head with vertical and horizontal spinning lasers and the planes swept by the spinning lasers.
Figure 3B:
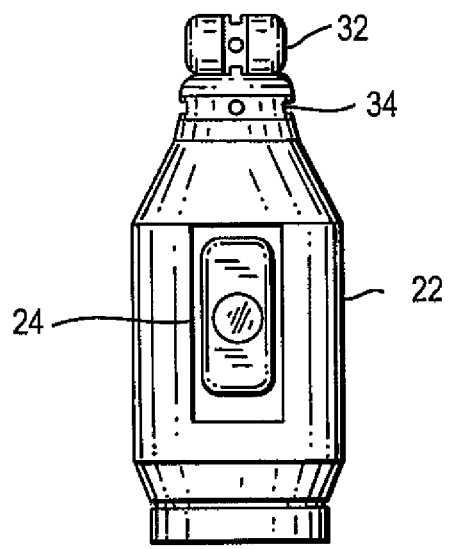

FIG. 3A shows the horizontal and vertical planes, 40 and 38 respectively, swept by the horizontal and vertical spinning lasers 34, 32. The spinning lasers are capable of sending and receiving information such as telemetry information. The lasers 32, 34 can read and write into the processor telemetry information. The lasers are used by the Master station 22 to help determine location and orientation automatically of the Master station and other devices within a multidimensional space the Master station and such other devices are located; this is done by measuring the distances from the Master station to these various other reference points. FIG. 3B shows the Theodolite portion of the Master station 20 of FIG. 1 without the tripod 24.

The lasers 32 and 34 can be communications laser comprising pulse modulated spinning laser mechanisms that are mounted atop the Master station 20. The Master station provides visible horizontal and vertical reference laser lines. The Master station is capable of reading barcode information printed on objects within its line of sight. Additionally the lasers 32 and 34 are pulse modulated and are capable of transmitting data to a device that can receive the information.

Sensors (not shown), which can be placed near the lens assembly 24, are used to enable receiving and interpreting or reading of information sent from a pulse modulated transmitter. The lasers 32, 34 of the Master station 20 can communicate with other similarly equipped Master stations, substations, vehicular or fixed reference stations. FIG. 3A is an isometric view of the Master Station 22 without the tripod. The blanketing effect of the spinning lasers is shown. FIG. 3B is a front plan view of the device. A blanketing effect can be produced by generating a horizontal plane and a vertical plane of laser light emanating from the top of the Master station 20.

Figure 4:
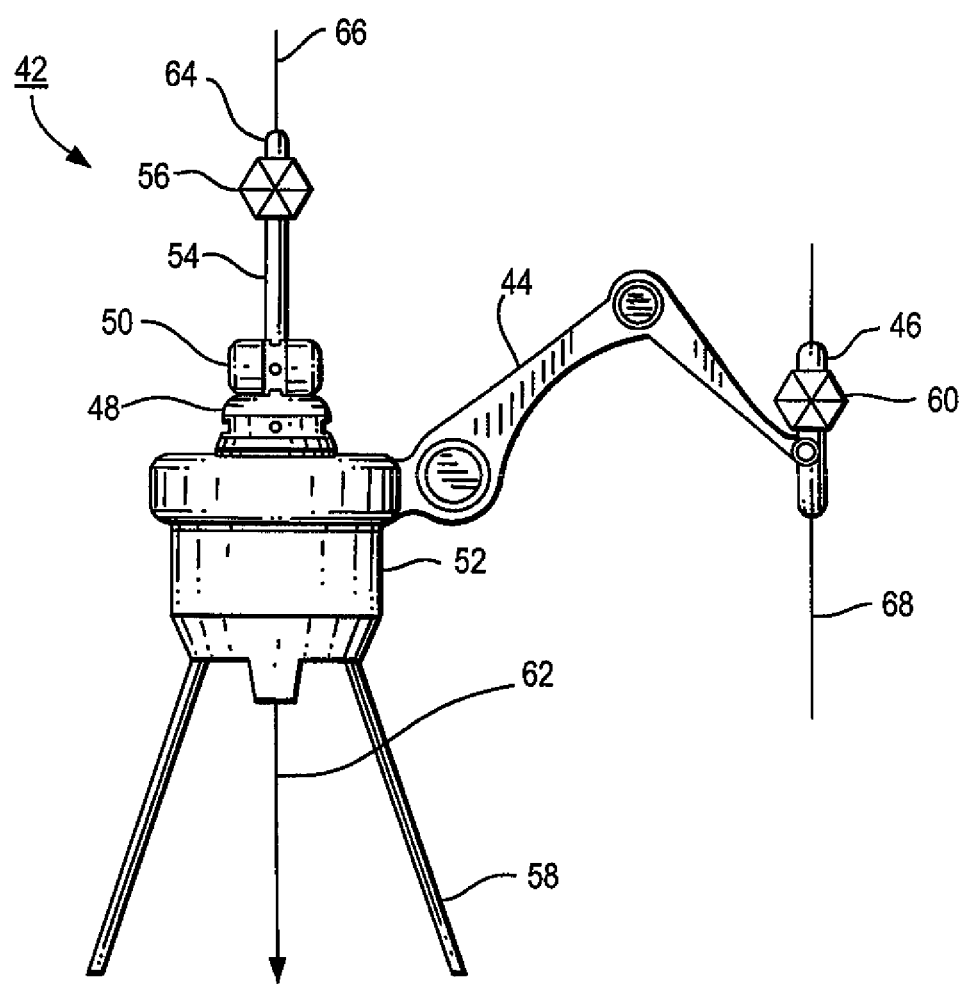
FIG. 4 is a front view of a transportable substation with a robotic arm.

A transportable substation 42 is shown in FIG. 4. The substation of FIG. 4 has a robotic arm 44 with a laser pointer 46 and accompanying electronic devices to help measure distances and thus help locate, through triangulation or other well known techniques, reference points, other devices, other substations. As with the Master station of FIG. 1, horizontal and vertical spinning lasers 48, 50 are mounted on top of the station's housing. Emerging from the top of the station is a pole 54 upon which a 360° corner cube prism 56 is mounted. Any light impinging upon this prism from any direction is reflected along the same line of sight from which it came. The station is mounted on a tripod 58 (only two legs are shown) that maintains the station the station in a fixed position in space. Emerging from the side of the mechanical enclosure is a movable robot arm 44. At the end of the robot arm is a pole upon which a prism 60 is mounted. Also at the end of robot arm 44 is a laser pointer 46 the can be use to measure distances and to read and write information in the form of reflected or transmitted optical signals. A laser pointer 64 similar in operation to laser pointer 46 is located at the end of pole 54. The robot arm pole can be positioned easily. Substation 42 can transmit laser beams in a various directions from different sources:

a. plumb beam 62 transmitted downward in the true vertical direction to determine height;

b. a vertical beam 66 transmitted upward to be redirected through the pole 54 to act as a visible laser pointer and an electronic distance reading and writing device.

c. a vertical beam (not shown) transmitted upward to be redirected through the vertical and horizontal optical spinning units; and, d. a beam 68 transmitted through the robot arm pole to act as a visible laser pointer and electronic distance measurement reading and writing device.

The X, Y, and Z position in space (position in space based on 3 orthogonal axes of a Cartesian coordinate system) of the transportable substation 42 as well as the position and orientation of the robot arm is known by the corresponding controlling Master station. Single or multiple substations may be utilized independently with a Master station, or multiple stations may be daisy chained together with each other.

Figure 5:
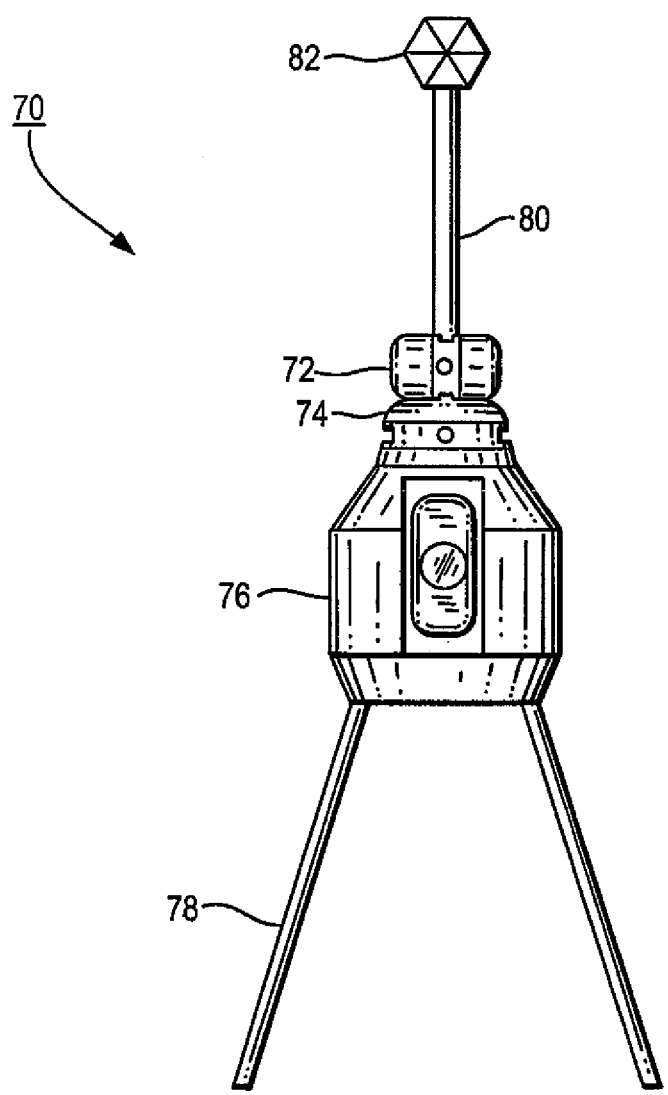
FIG. 5 is a front view of a transportable substation.

FIG. 5 shows another embodiment of a transportable substation. Transportable substation 70 is an electronic distance measurement substation, and it is capable of emitting a visible laser beam so as to cause a spot to impinge upon a specified position. It is relatively smaller, lighter, and less expensive to manufacture than the substation of FIG. 4. There is a spinning laser mechanism comprising lasers 72 and 74 mounted on top of the robotic Theodolite head 76. Head 76 is mounted on tripod 78. The spinning laser mechanism emits horizontal and vertical reference laser lines. The spinning lasers are able to act in a unit that receives, sends, reads, and writes coordinate telemetry. This is done by searching for and measuring the distance to any number of fixed reference stations, master stations, or other substations. The X, Y, and Z position is always known by the Master station. The device is meant to be readily carried and moved around a worksite and is a solution for pinpointing coordinates not within the line-of-sight of the Master station. That is, substation 70 can measure distances to certain reference points, determine the location of these points within a multidimensional space and relay the position of these points to a controlling Master station. A pole 80 the end of which a prism 82 is mounted extends from the spinning lasers and the head 76. Although substation 70 is transportable, it can be fastened to the ground or possibly to an I-beam. Single or multiple transportable stations such as station 70 may be utilized independently with a master station or multiple substations may be daisy chained together with each other.

Figure 6:
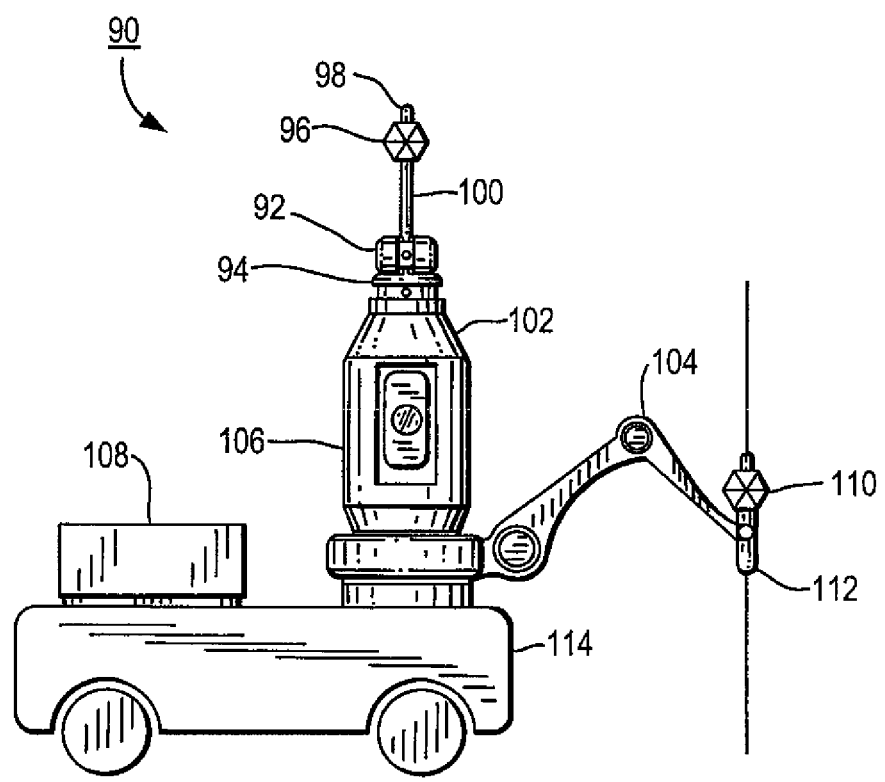
FIG. 6 is side view of a mobile Master station or substation.

FIG. 6 shows a Mobile device that can operate as a mobile substation or a mobile Master station. The device 90 as a substation operates substantially similar to the substation of FIG. 4. In additional to toolbox 108 mounted on vehicle 114, the equipment mounted on the vehicle includes a robotic Theodolite 106 with robotic arm 104 at the end of which is a prism 110 and a laser pointer 112. The laser pointer 112 can be replaced by any one of the tools stored in toolbox 108. Mounted on top of the Theodolite are horizontal laser 94, vertical laser 92, pole 100, prism 96 and laser pointer 98. The head portion 102 of the Theodolite 106 can be replaced to allow the device to operate as a Master station or a substation. As a Master station, the device is a combination of a fully robotic active prism, a tracking laser distance measurement apparatus that is fixed or fastened to a vehicle that can be manually, remotely controlled, or can autonomously navigate itself within a specified environment; these devices are combined with a multi-axis computer guided robotic tool arm 104 that is capable of automatically changing work tooling to perform construction activities in real time. The ultimate purpose of this Master station is to navigate and spatially orient the device in relation to the space in which it is place or to CAD drawings. This is accomplished by automatically searching for and continually measuring and re-measuring the distance to any number of fixed reference points, substations or any other fixed or mobile Master stations. The device can move to selected positions on its own, and once there, can utilize a variety of specified tooling to perform various work functions. It can navigate according to self contained computer instructions, or can be made to navigate by other fixed or mobile Master stations. Some of the tasks that can be performed by this Master station are paint, point, mark, burn, cut, weld, drill, engrave, measure, or read or write, and can send and receive telemetry in real time. To that extent, the tools on the robot arm are interchangeable, and can be retrieved from the tool box 114 mounted atop the vehicular robot. Of course, a substation (very much like that shown in FIG. 5) can also be mounted atop the vehicular robot rather than a Master station. A 360° corner cube prism is mounted atop the pole emerging from the Master station module head. A similar prism can also be mounted at the end of the robot arm.

Figure 7A:
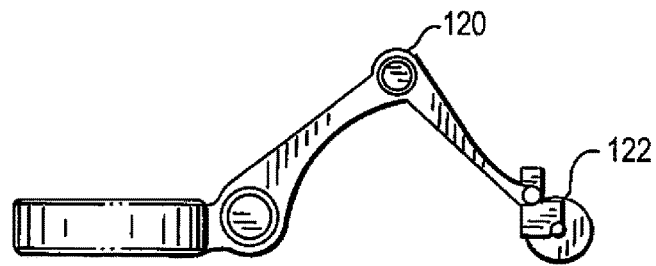
FIGS. 7A-E show the various types of robotic arms that can be attached to a Master station or a substation.
Figure 7B:
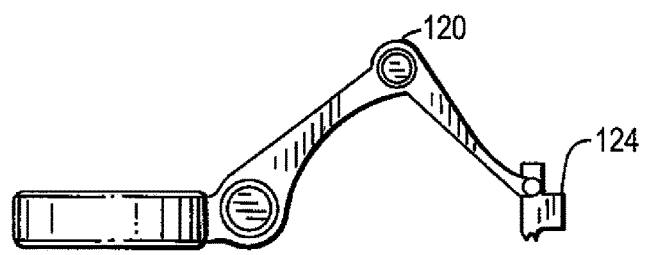
Figure 7C:
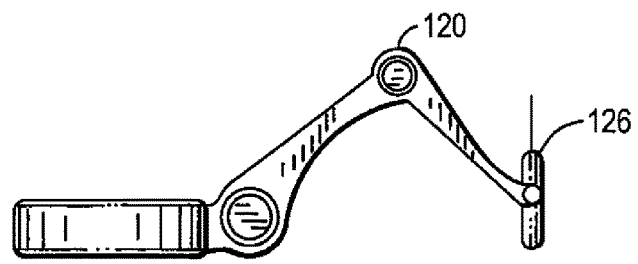
Figure 7D:
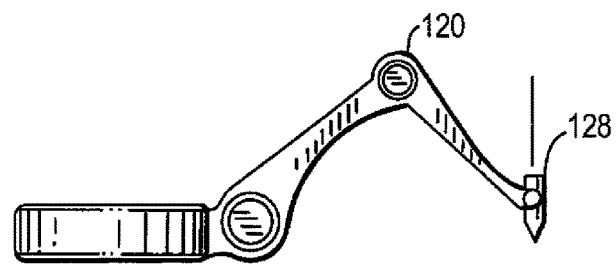
Figure 7E:
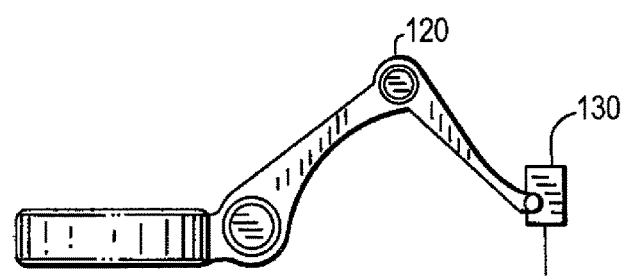

FIGS. 7A-E show the various interchangeable tools that can be mounted to the robot arm (44, 104) of the device of FIG. 4 or 6. Shown here is an array of interchangeable tools for the robot arm 120. FIG. 7A shows the robot arm with a cutting tool 122. FIG. 7B shows the robot arm with a printing or plotting tool 124. FIG. 7C shows the robot arm with a plumb visible laser pointer 126. FIG. 7D shows the robot arm with a Coordinate Measuring Machine (CMM) 128, a laser scanner, or a manual point reading tool. FIG. 7E shows the robot arm with drilling, engraving and burning tool 130.

Figure 8:
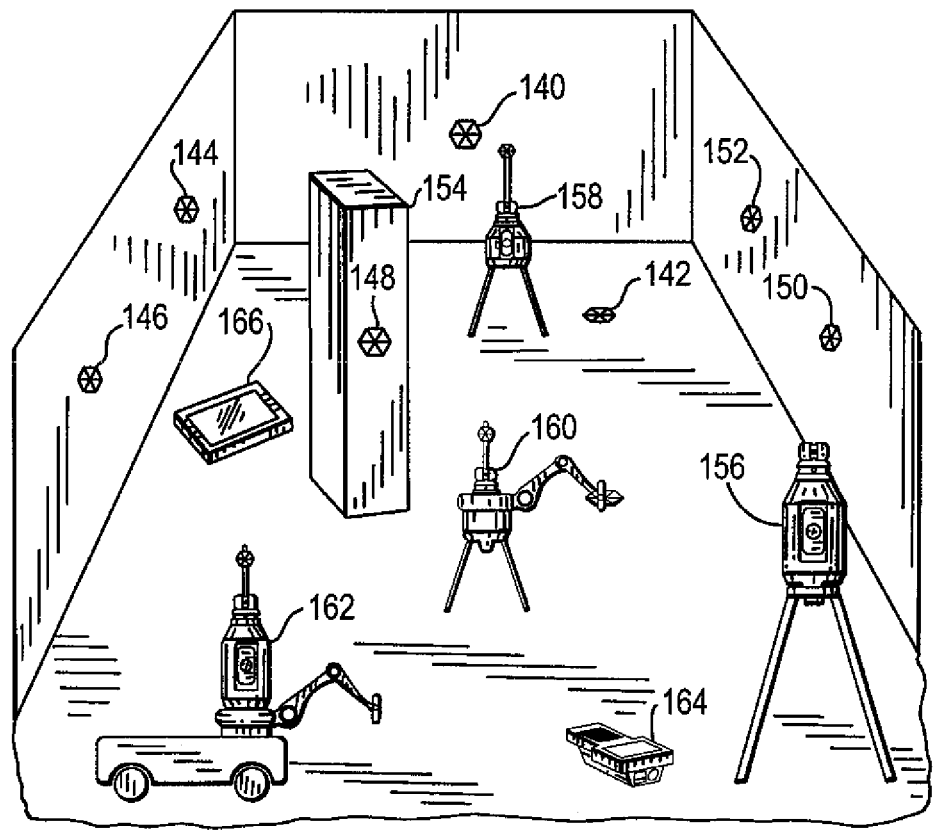
FIG. 8 shows one particular embodiment of the system of the present invention comprising a Master station, substations and fixed reference points or monuments.

FIG. 8 illustrates a building enclosure configured to use the system of the present invention. A kit of the system of the present invention is provided. All of the components of the kit are shown in FIG. 8. The fixed reference stations 140, 142, 144, 146, 148, 150 and 152 are shown in the figure as 360° corner cube prisms, but they can be selected from among many devices that provide a readable fixed reference. The fixed reference stations may be passive devices. However, the can also be active or intelligent devices capable of transmitting information to receivers, or they can optically respond to specific messages. The fixed reference station can be located at various locations to allow a Master station to identify specific points within the multidimensional space. For example, a fixed reference stations cab be fastened or planted on a concrete slab or fastened to a permanent location, or mounted in a monument at a known location which is addressable and identifiable. Monuments allow for automatic and autonomous device orientation in relation to the space in which these devices have been placed or to the CAD drawings. The signals by which a Master station can identify reference stations are inter alia, electromagnetic (e.g., light, colored light, infrared, RFID, X-rays, bar code, etc.), ultrasound, digital compass, cybernetics information theory and coded information.

FIG. 8 shows five fixed reference stations (146, 144, 140, 152, 150) mounted in the walls, one fixed reference station 142 mounted on the floor, and one fixed reference station 148 mounted in a monument 154. The kit further comprises devices that act upon information obtained regarding the fixed stations. These devices are Master station 156, transportable station 158, armed transportable station 160, vehicular station 162, handheld computer 164 having built-in electronic distance measurement, and a tablet (or laptop computer) 166. As already discussed, the Master station 156 can locate the references by itself or with the use of the substations. The fixed references are shown as prisms and thus are located with the use of laser through direct line of sight. Thus, those fixed references not in the direct line of sight of the Master station, but in the line of sight of one of the substations can still be indirectly identified by the Master station. That is, a substation can identify a fixed reference and send that information to the Master station. The Master station can then use the location information of the fixed references to identify its position within the enclosed space. Information about the location of the substations can be transmitted to the Master station wirelessly by the various substations. In the example shown in FIG. 8, station 158, 160 and 162 can be substations. Stations 156 and 164 can be Master stations. Tablet or laptop 166, not having any distance measuring equipment, can probably serve as the processor wirelessly coupled to Master station 166. Commands from Master station 156 are generated on the keyboard of laptop 166. Master station 156 can be a robotic Master station whereby its movement during its search of fixed reference points are controlled by commands and/or an actuator that is part of or coupled to laptop 166. Those references not in the direct line of sight of Master station 156 may be detected by substation 158, 160 or 162 and the location information gathered by those substations can be relayed wirelessly to Master station 156. Master station 164, which is a handheld computer with distance measuring equipment, operates in a similar to Master station 156 in that it uses its measuring equipment and information from the substations to locate the fixed reference points. Unlike Master station 156 which can be operated from tablet 166 or manually by a user, Master station 164 (see discussion regarding FIG. 11 infra) is a stand alone device directly operated by a user through the entry of commands via the keyboard or some actuator (e.g., mouse, joystick) of handheld computer 164.

The purpose of the fixed reference station system is to provide fixed reference points for automatic, autonomous, device orientation and navigation in relation to the space in which they are placed according to CAD or digitized drawings. These devices orient themselves and navigate through the space by continuously searching for, measuring and re-measuring the distance to any number of fixed reference stations located in the same space. The ultimate goal is to achieve greater measurement accuracy and to navigate autonomously or through a remote controlled vehicle, a humanoid robot, an android, or other robots or robotic vehicles, tools or systems indoors or outdoors from a CAD drawing. It is important to note that the Master station may start the process of measuring and locating fixed reference points with a CAD drawing or other drawings already uploaded in the memory of the Processor of the Master station and the location of the fixed references documents; in such a case the Master station would confirm the accuracy of the documented information and still generate a graphical representation of the space including objects and structures in the space. The graphical representation generated by the Master station of the system of the present invention may deviate from the graphical representation already documented. As each monument, structure, and boundary of the space is measured and identified, the graphical representation being generated by the system of the present invention is updated and the displayed drawing changes accordingly. The updates to the graphics display is done in real time; that is, as the information is processed by the processor and the new portion of the graphics is added, the viewer sees the new portion and the rest of the graphics. Further, the user of the Master station such as Master station 164 not only is viewing the display of the space but the Master station/user location is also displayed in the graphical representation allowing the user to be guided or navigate through the enclosed space. Certain objects and/or structures may have already been documented in the uploaded CAD or digital drawing, but are not yet present in the space. In such a case, the Master station 156 may, for example, direct a vehicular substation 162 to the intended location of an object indicated in the CAD drawing and have substation 162 make markings to indicate the exact placement and orientation of the object already identified in the CAD drawing. Other similar tasks can be performed by substations under the direction and control of one or more Master stations. Furthermore, the substations may have processors with the CAD drawings already uploaded and thus autonomously are able to perform tasks based on the location of certain objects according to the CAD drawings and the particular software running on the processors of the substations. A display of the space with objects and structures can be seen by the user, but in the actual space none of the objects and structures exist yet. Thus, a substation equipped with a robotic arm with a tool attached thereto can perform tasks to facilitate the construction of such objects and/or structures or construct the object and/or structure itself. For example, the substation can drill holes, make markings, cut surfaces in preparation for the construction of an object, monument or structure at a specific location identified to be the location of the object by the CAD drawing uploaded in the processor of the substation or in the processor of the Master station controlling the substation.

Figure 9:
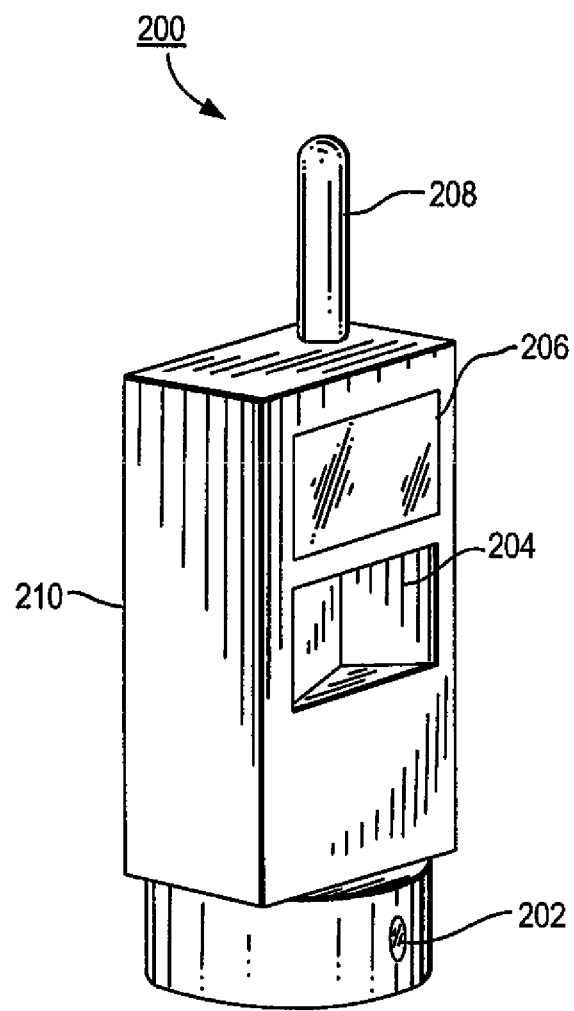
FIG. 9 is a perspective view of an active fixed reference point which may function as a substation.

FIG. 9 is a perspective view of an intelligent fixed reference station (i.e., an active substation) sensor and transmitter array. Acting as an intelligent monument that knows its position, this device is able to communicate with other similar substations or Master stations. The device of FIG. 9 can send, receive, and redirect any electromagnetic signal, such as light, or ultrasonic signals. The intelligent fixed reference station of FIG. 9 comprises horizontal spinning laser 202 which also has a sighting and a reading device. The spinning laser 202 may also operate as a bar code or graphic reader. In addition, the fixed reference station of FIG. 9 further comprises a dynamic reflector/prism 204. The reflector/prism 204 comprises a corner cube prism, a movable prism and a holographic optical element. Additionally, the reference station of FIG. 9 contains a sensor receiver 206 and a wireless communications receiver and transmitter 208. Finally, the reference station of FIG. 9 comprises a housing 210 to contain the electronics and to hold the device together.

Figure 10B:
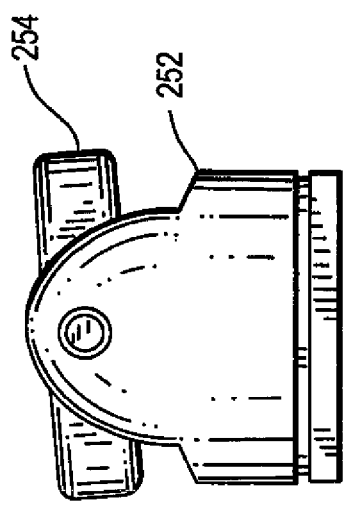
FIG. 10 shows front and side views of a PTZ camera mount for a handheld laser distance measurement tool.
Figure 10A:
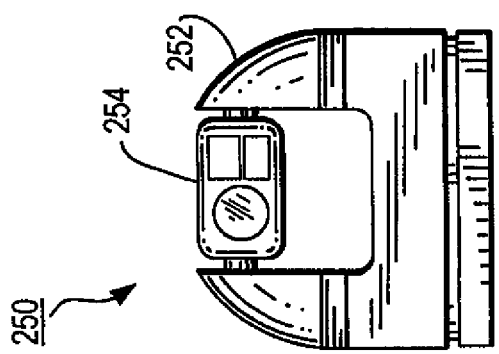

FIG. 10A represents a front elevational view of the device while FIG. 10B represents a left side elevational view of the device. The device shown can be a Leica Disto device or similar laser distance measurement device. This is a motorized and remotely controlled pan and tilt mount 254 for an electronic distance measurement device 250. Movement of the gantry 252 can be controlled by system software via a joystick, mouse, touchpad, keys, stylus, digitizer or with the use of a gyroscope, or inertial measurement unit input. The camera mount 254 shown is a motorized and remotely controlled pan and tilt mount. It can also function as a non-motorized manual jig. It affords the ability to precisely read distance, barcodes, or graphics, and to precisely point to a specified location.

Figure 11A:
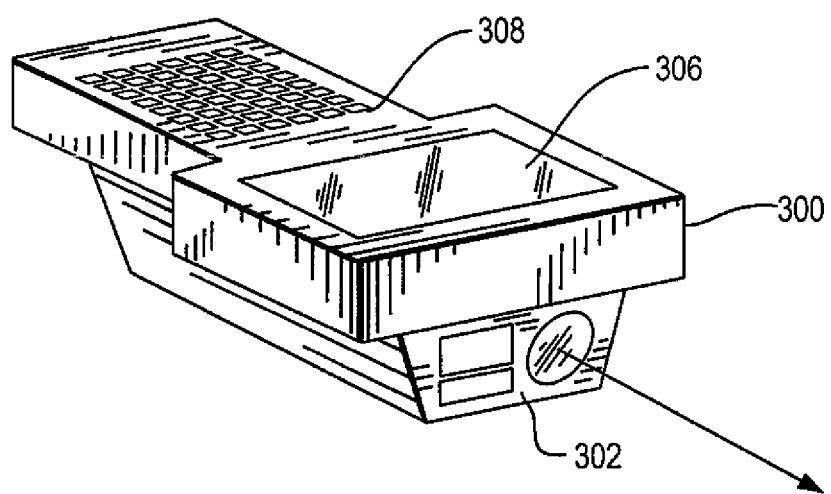
FIG. 11A shows a handheld computer equipped with laser distance measurement devices.
Figure 11B:
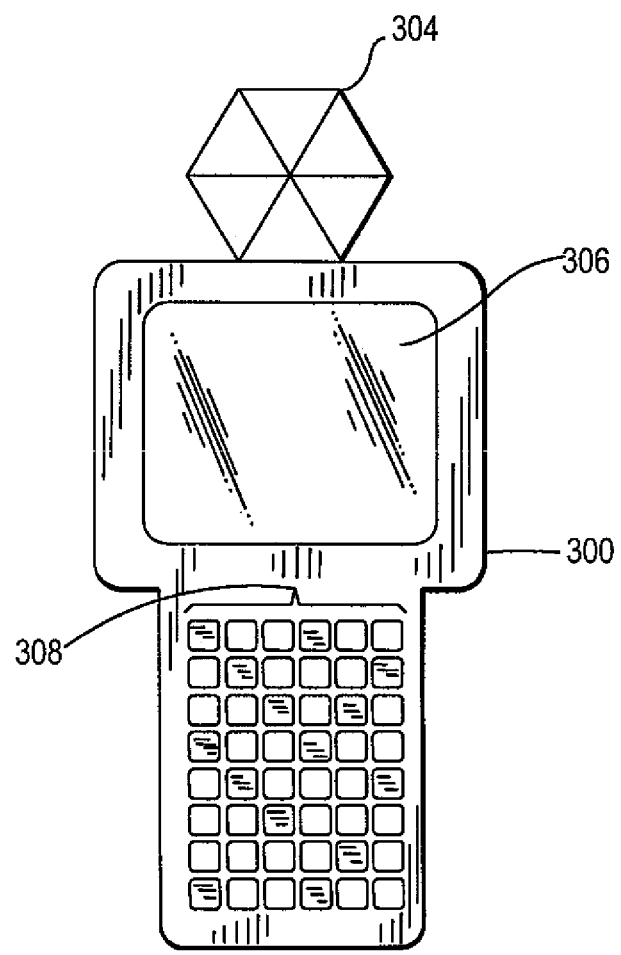
FIG. 11B is a tope view of 11A with a prism shown attached to the handheld computer.
Figure 11C:
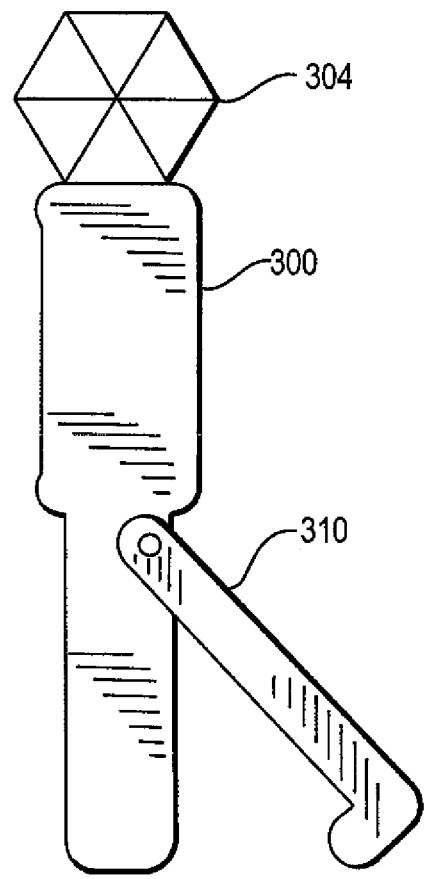
FIG. 11C is a side view of the handheld computer of FIG. 11A with a supporting tripod shown as well.

FIG. 11B is a top plan schematic view of a handheld computer station 300 having a Prism 304 (e.g., 360° corner cube prism) mounted above the display 306. FIG. 11A shows an isometric view of the handheld computer 300 with a laser distance measurement device 302 built-in or attached and keyboard/keypad 308. N dimensional graphical representation of the space, objects and/or structures therein and other information can appear on the display 306. The computer will typically be held by a user. The function of the Prism 304 is to serve as a location device meaning it can receive and reflect optical signals allowing other devices to locate the handheld computer station 300. FIG. 11C is a side elevational view of the handheld device of FIG. 11B. In FIG. 11C the computer is made to stand up using a built-in support 310. Support 310 may be configured as a tripod. A Master Station (or Substation) can locate handheld computer 300 through optical communication with prism 304 as discussed above. Once handheld computer 300 is located, the entire system knows the location (in XYZ coordinates) of a user operating the handheld computer. Also, the user knows his or her own location relative to the Master Station, Substations, and fixed reference points. Now, as the user moves through the site, the system, by tracking the prism 304 of the handheld computer 300, is aware of the user's movements. The handheld computer 300 may thus be used as a navigation tool to guide the user move through the space in much the same way a GPS system is used in an automobile.

Figure 12:
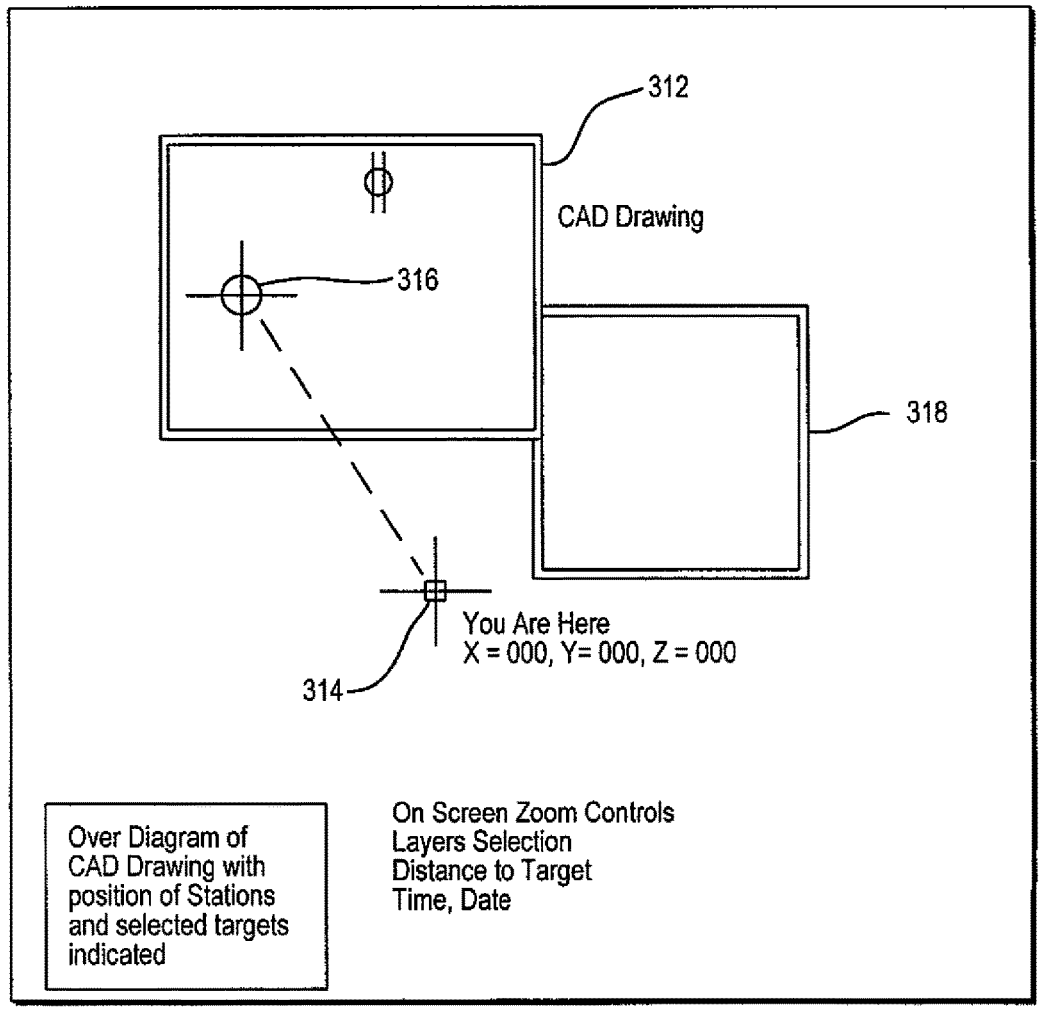
FIG. 12 is a diagram of the type of graphics or drawings that can be displayed by the handheld computer of FIG. 11.

FIG. 12 is an illustration of the display of the handheld computer of FIG. 11. A CAD drawing (or map) 312 is overlaid with a marker 314 showing the position of the user. Alongside that marker, the coordinates of the user's present position are shown immediately below the words, "You Are Here". Also, a user may select a target position 316 which will also appear on the screen. Upon command from the user, the handheld computer will direct the user to the target position (e.g., by issuing voice commands in a similar manner to an automobile GPS). As the user moves toward or away from the target, the CAD map moves also, and the "You Are Here" indicator shows the user's present position on the map. There are also on-screen zoom controls. In addition, the user is permitted to select various layers (e.g., layer 318) of the map (e.g., one showing plumbing or electrical work). The display also shows the current distance to the selected target. The positions of the reference stations are indicated. The date and time are also displayed. All of this is accomplished using software which is a component of the system of the present invention.

The robotic laser distance measurement Master station control software is located within a handheld, laptop, tablet or desktop computer with the ability to communicate with (sends commands and/or receive commands) Master stations, Substations and other equipment of the system of the present invention. The software operatively sends commands and receives telemetry back from the Master station. The software sends commands to the Master station's firmware telling the Master station to perform specified tasks (e.g., turn in a specified direction, move up or down to a particular angular position, turn the visible laser pointer on or off measure distance or angle etc.). The Master station responds by executing the requested functions and then sends performance or measurement telemetry back to the software.

The software has a graphical user interface purpose built for use within the construction and architectural marketplace. The software is geared to performing specific reading and writing construction tasks rapidly. The software mimics the look and feel of GPS systems that are utilized in automobiles or other vehicles for navigation. The user navigates within a CAD drawing that represents the building under construction. As discussed previously, the software is used in conjunction with a Master station to create as built studies of existing architecture in the form of 2D or 3D CAD drawings in real time (reading). The software is used to navigate to and layout construction work from 2D or 3D CAD drawings in real time.

Features of the software include:
a. "YOU ARE HERE" is displayed on the screen.
b. In Prism Tracking Mode or Visible Laser Pointing Mode in the XYZ coordinates are displayed on the screen.
c. In "Active Laser Pointing Mode" or "3D Mouse in Space Mode": the laser follows or tracks to wherever the mouse moves in space.
d. Once a target or point in space is selected "Distance to Target" from present location is displayed on screen.
e. Transfer seamlessly between reflectorless mode and Prism Tracking mode.
f. Shoot a visible laser in prism tracking mode.
g. Position control and zoom control is "ghosted" (displayed over the drawing and somewhat transparent or diaphanous).
h. Access to alternate drawings or drawings layers is available.
i. Power Search or Call Master Station function is present (the Master station will follow a procedure to actively search for the prism location).

Figure 13:
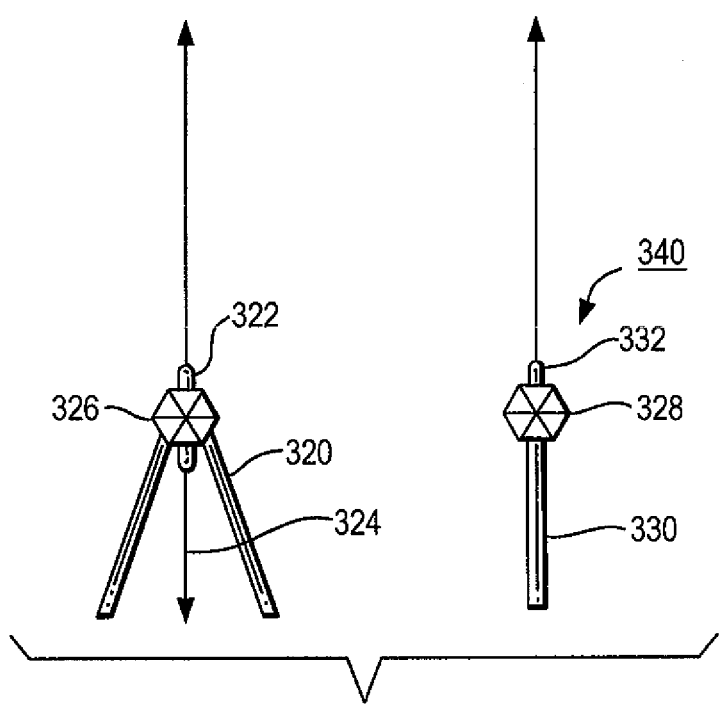
FIG. 13 shows a prism pole with visible laser pointer and same pole on a tripod.

FIG. 13 is a schematic illustration of a tripod mounted prism pole 320 having a visible laser point 322 that points vertically up and down. The prism pole further comprises built-in electronic distance measurement device which is part of the laser point. Device 320 in FIG. 13 is measuring distance to another prism pole, i.e., short pole mount 340, comprising prism pole 330, prism 328 and laser pointer/distance measuring device 332. Device 320 emits a plumb laser beam 324 to determine its height off the ground. The two prisms 326 and 328 are aligned, and the distance between the prisms is measured.

Figure 14:
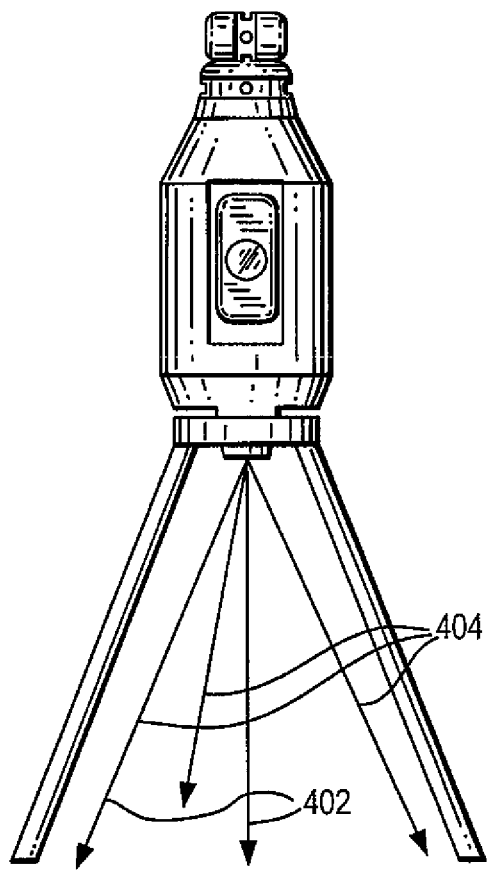
FIG. 14 shows the Master station of FIG. 1 having multi-beam distance measuring device to determine its height and planar orientation.

FIG. 14 shows how a robotic Master station 400 that is able to determine its orientation and position from the ground where the ground is rough and not level. In order to do this, the instrument directs four laser beams toward the ground. Three of the laser beams 404 are directed to the bases of the three tripod legs. The fourth laser beam 402 is a plumb beam directed vertically downward. The three beams 404 directed at the tripod leg bases determine the planar orientation of the device. The plumb beam determines the vertical distance of the instrument to the plane. From that point, the precise orientation and location of the instrument with respect to the ground is known. The rest of the operation of Master station 400 is similar to the Master station shown in FIG. 2.

Figure 16:
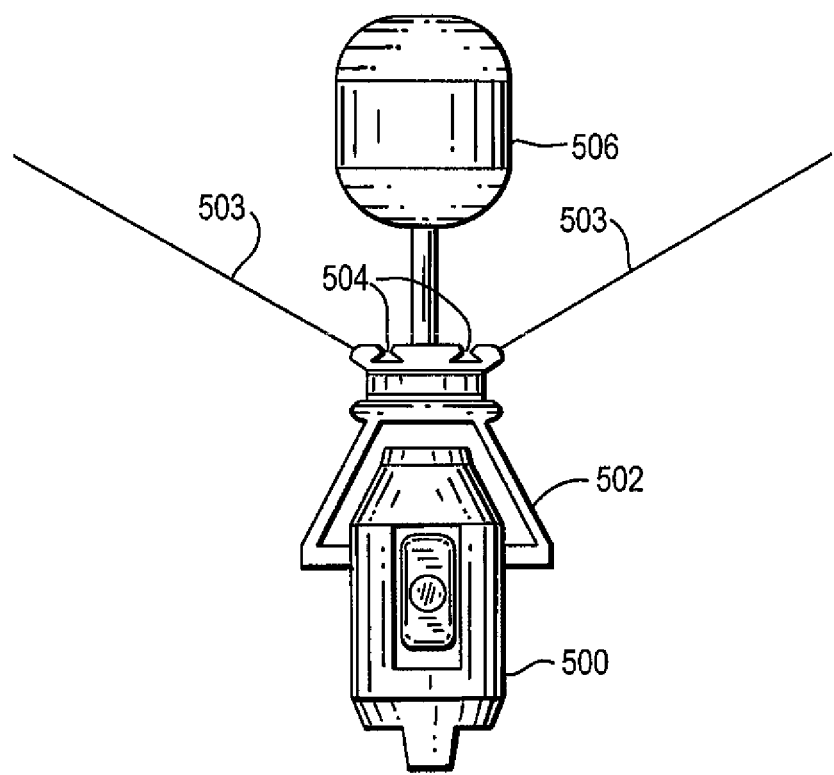
FIG. 16 shows the gyroscopically stabilized device of FIG. 15 applied to a computerized cable driven system.

FIGS. 15A-D shows how a Master or substation station configuration that can be suspended above the ground and can traverse a multidimensional space such as a construction site while measuring distances to fixed references and other devices from above. FIGS. 15A and 15B show rail driven systems. FIG. 15A is a Master station 500 having a gyroscopic stabilization unit 506 mounted on its top. The stabilization unit 506 is attached to a gantry 502 (preferably a computer controlled or software driven gantry) with rail slots 504. FIG. 15B shows another rail mounting arrangement using rail 501 to slidably mount Master or Substation 512. FIGS. 15C and 15D show the cable driven and hover driven stations 524 and 530 respectively; the cables 520 and hovers 532 are shown for the respective stations. FIG. 16 shows the device in FIG. 15A adapted to a cable driven arrangement with cables 503.

FIG. 17 shows tools that would be mounted to the bottom of a robotic vehicular station or to the robot arm. These devices would be used to mark a surface according to predetermined instructions. FIG. 17A shows the head of a spring loaded awl and FIG. 17B shows the head of a spring loaded marker or paint stick.

Normally, a prism pole is handheld, and is therefore subject to movement when the holding person's hand shakes. Gyroscopic stabilization of a prism or station has been discussed supra. An alternative stabilization technique is shown in FIGS. 18A and 18B.

Figure 18A:
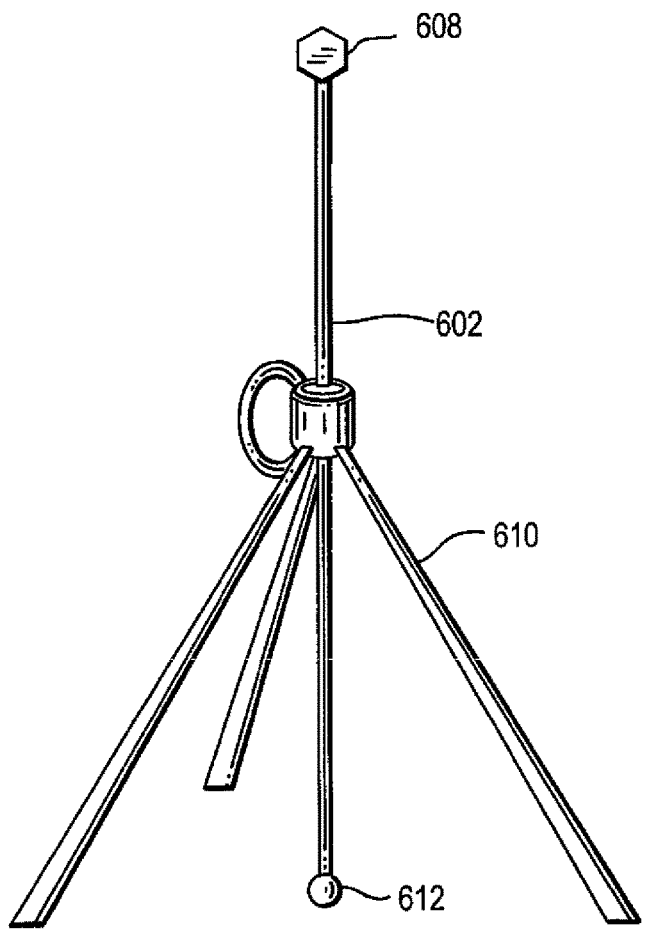
FIG. 18 illustrates a stabilization system for a prism pole.
Figure 18B:
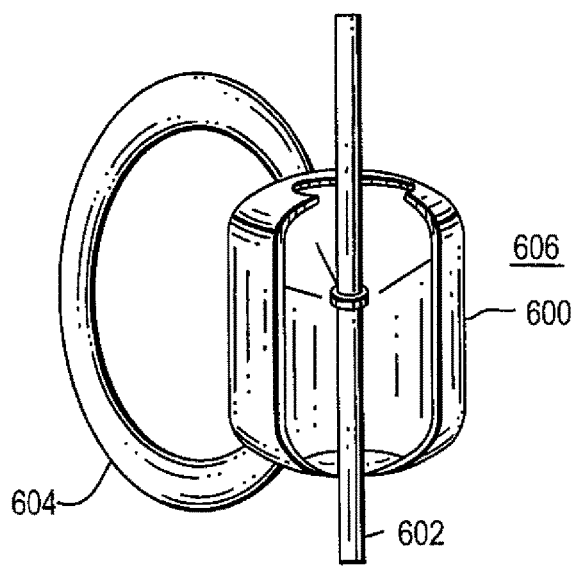

FIGS. 18A and 18B show an alternative stabilization device for a pole 602 with a prism 608. The entire pole shown in FIG. 18A, and the stabilization device is shown in FIG. 18B. The stabilization device 600 is an enclosed compartment having two openings to allow pole 602 to pass therethrough and handle 604; the stabilization device is supported by tripod 610. Within the enclosed compartment 600, the pole is suspended either by strings 606 as shown or by a viscous liquid damping rods similar to those used to slow the movement of doors. The damping rods are critically damped in order to be effective. The pole is weighted at the bottom with weight 612 so that it points toward the center of the earth. Therefore, the weight 612 acts as a plumb bob.

Figure 19A:
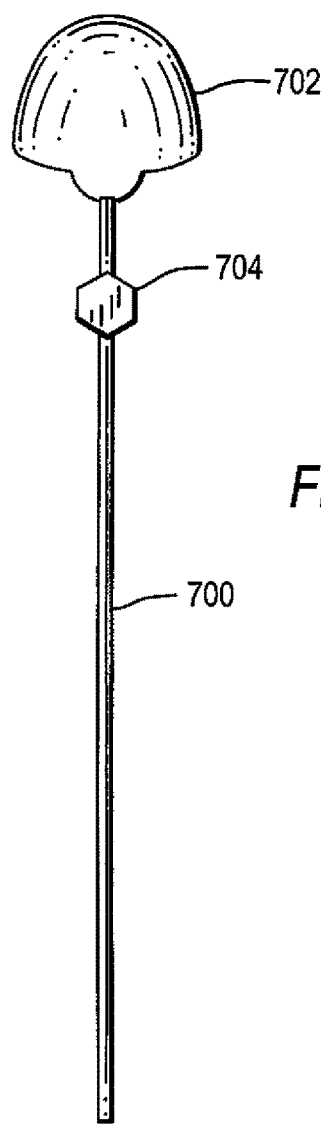
FIGS. 19A-B illustrates yet another stabilization system for a prism pole using gyroscopes and stabilization electronics using fuzzy logic.
Figure 19B:
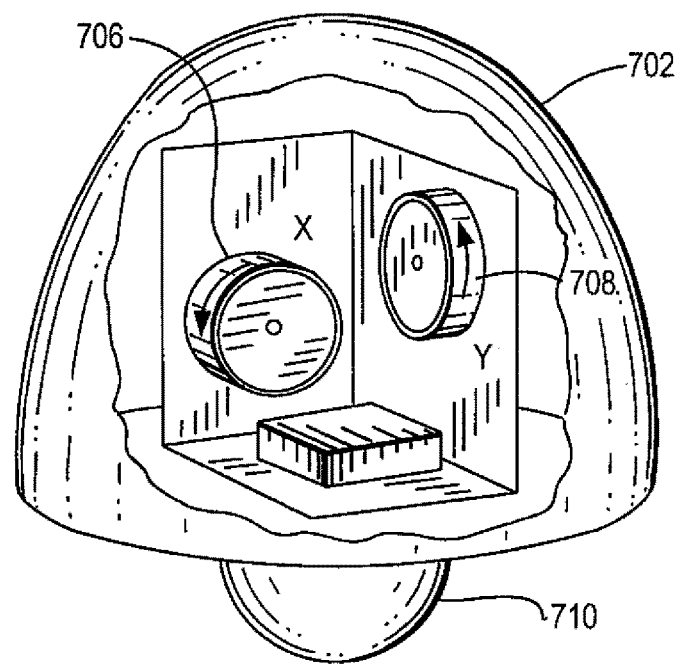

FIGS. 19A-B show yet another stabilization mechanism. It is a modified gyroscopic mechanism. FIG. 19A shows the entire pole 700 with a stabilization head 702 and a prism 704 mounted below the head 702. A schematic view of the head 702 is shown in FIG. 19B. Within the head 702 there are disposed X and Y directional gyroscopes and an electronic processor 710 (e.g., fuzzy logic processor) is used for stabilization in the Z direction. This device will defeat the vibration and inaccuracy caused by the user holding the pole. The Gyroscopically stabilized pole shown in FIGS. 19A and 19B is meant to generate a more consistent and steadier platform for a prism. The electronics control the gyro rate of rotation in real time to increase pole stability.

Figure 20A:
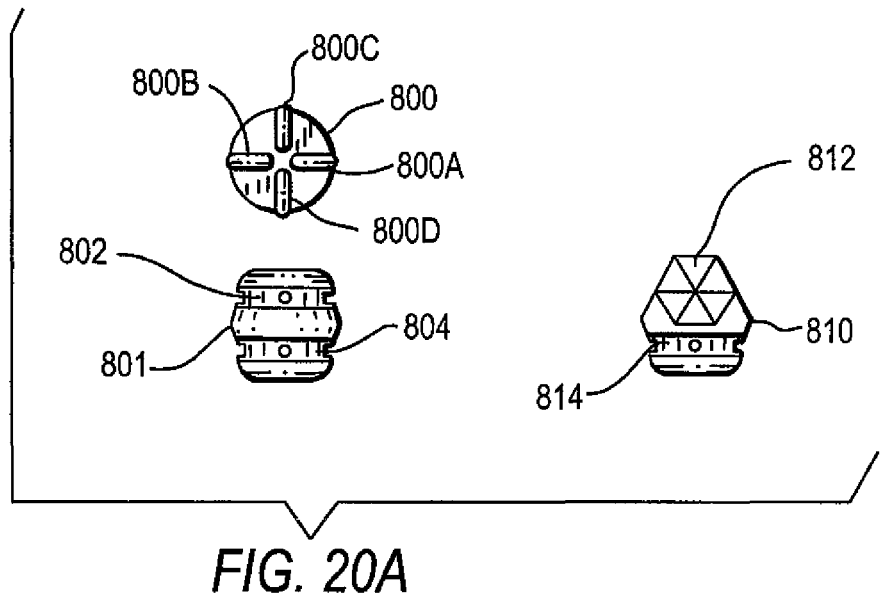
FIG. 20 shows a system of the present invention comprising a spinning laser Master station and a spinning substation.
Figure 20B:
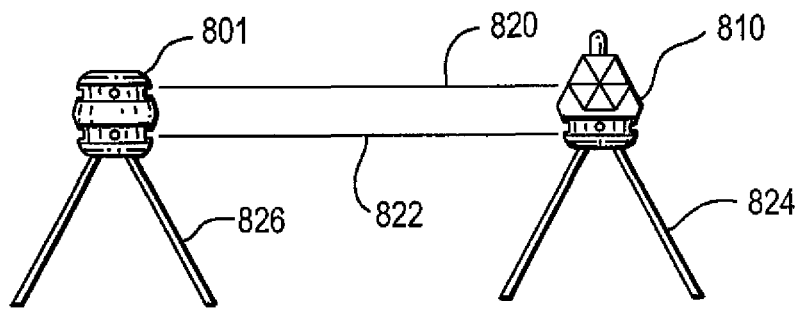

FIGS. 20A-B illustrate the use of the combined Master Station 801 with spinning lasers and wireless transmitter and receiver and Substation 810 with spinning lasers and wireless transmitter and receiver and a prism 812. The wireless transmitters and receivers for both the Master station and the Substation are disposed within the stations and are thus not shown in FIGS. 20A and 20B. The advantages and functionality of this combination are described therein. This system is intended for use independent of or in place of a Master station module to measure distances and help a user navigate within a multidimensional space. The Spinning Master Station 801 can deliver XYZ coordinate measurement and position triangulation data to wireless computer devices for the purpose of navigation and measurement on a worksite from a CAD drawing or digitized drawing.

The Spinning Master Station 801 is a reader and measurement device comprising two Distance Measuring Lasers and two Prism Sighting lasers all mounted within the upper section of the device enclosure. A top view of Master Station 800 is also shown in FIG. 20 with Distance Measuring lasers 800A, 800B and prism sighting lasers 800C and 800D all mounted within the top section of Master station 800. The prism sighting lasers are capable of reading barcode information printed on objects within its line of sight. Mounted within the bottom section of the device is an arrangement of four pulse modulated laser transmitters and four laser data receiver sensors; one of these 8 lasers is shown as 804 in FIG. 20A. These lasers are capable of transmitting data to one or more devices (e.g., Master stations or substations) equipped with sensors for reception of such optical signals. The sensors enable reading or receiving information sent from a pulse modulated transmitter. The Spinning Master Station can communicate with other similarly equipped Master stations or substations or fixed references. The Spinning Master Station mechanism can also be adapted for self leveling.

The Spinning Substation 810 has a 360 degree corner cube prism 812 mounted in the upper section of the device enclosure. Mounted within the bottom section of the device is an arrangement of four pulse modulated laser transmitters and four laser data receiver sensors one of which is shown as laser 814. Substation 810 can be adapted for self leveling. FIG. 20B shows Master station 801 mounted on tripod 826 communicating with Substation 810 mounted on tripod 824; the devices are communicating via laser beams 820 and 822. The Spinning Master station 801 and the Spinning Substation 810 can thus communicate with one another via pulse modulated lasers and receiver sensors. They exchange identification, telemetry and commands.

FIG. 20A illustrates the structure of a continuously spinning Master station with a prism transmitter and receiver array. This combination of spinning lasers with prism transmitter and receiver arrays and lasers arrays for transmitting and receiving information and processors and associated circuitry is a system that can replace a robotic Master station module or robotic Theodolite. By adapting presently available spinning laser levels, the device can deliver X, Y, Z coordinate measurements and position triangulation to wireless computer devices for navigation and measurement within a multidimensional space to generate a CAD or other type of graphical representation of the multidimensional space. The reader, measurer comprises two prisms sighting laser beams, two distance measuring laser beams on the top array. The reader, writer comprises four data transmission lasers, four laser data receiving sensors on the bottom section of each device. Each of the station may also be equipped with wireless radio transmitter and receivers.

Each of the stations may have the following components/functionalities:
 a. self-leveling visible lasers;
 b. able to send data via a laser beam;
 c. able to receive data via a laser beam;
 d. able to measure distance to multiple prisms;
 e. able to differentiate between prisms based on return signal; and,
 f. able to transmit information wirelessly.

Figure 21A:
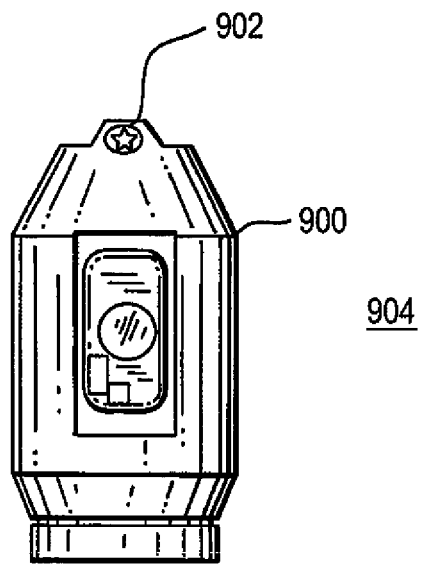
FIGS. 21A-B show another embodiment of the system of the present invention using colorized prisms as fixed reference points or monuments.
Figure 21B:
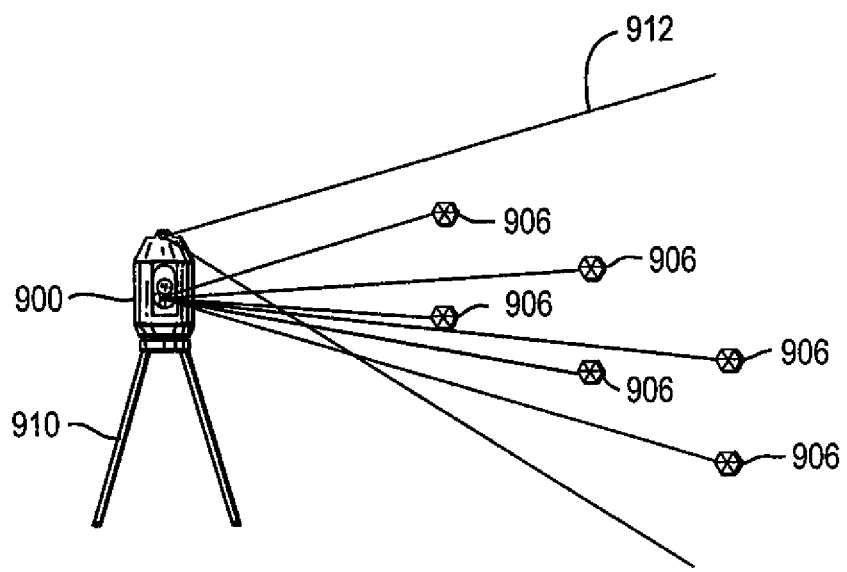

Referring to FIGS. 21A-B, a multiple prisms assembly and identification device 900, which can function as a Master station, a substation or a fixed reference point, is shown. An infrared strobe 902 is mounted near the top of the device 900 and color Charge Coupled Devices (CCD) 904 are mounted near the lens of the device. CCD device 904 forms part of the receiver of device 900. Infrared light for transmission and reception is used and color recognition is used in the reception of optical signals. In FIG. 21B, multiple prisms 906 are shown where each functions as an individual monument or fixed reference point. Each prism returns light of a different color. In FIG. 21B, the infra red strobe flashes an infrared beam 912, and infra red light reflects back from the colored prisms. The infrared beam 912 is fanned out toward the multiple prisms so that there can be simultaneous identification of the plurality of prisms in the field of view.

The system shown in FIG. 21B, which can be referred to as a Colorized Prism Recognition System, is capable of delivering rapid Multi-Prism identification and individual prism recognition. When compared to an existing Master station—Prism Relationship the Colorized Multi-Prism Recognition System has three distinct functional features:

Each individual prism is constructed out of a different colored dichroic glass.
  The black and white CCD camera chip presently in place in Master station modules is replaced with a system that utilizes a spread beam infrared laser as a method of rapidly searching for a prism within the Master station modules field of view with a color CCD chip 904. Replacement of the black and white camera chip with a color CCD chip will enable the Master station module to differentiate between colors, thus making each prism individually identifiable or addressable. Presently an infrared laser is utilized in a fanning pass to search for a Prism within the Master Station module's field of view; this method can only identify one prism at a time.

An infrared strobe 902 or flash is used to identify the quantity and position of multiple prisms simultaneously within the Master station's field of view.

Referring to FIG. 21(B), the six Prisms are within the field of view of the device 900. Device 900, operating as a Master station, emits an infrared strobe light. Instantly, the position of each and every Prism is known based upon the unique color of the Prism.

Figure 22:
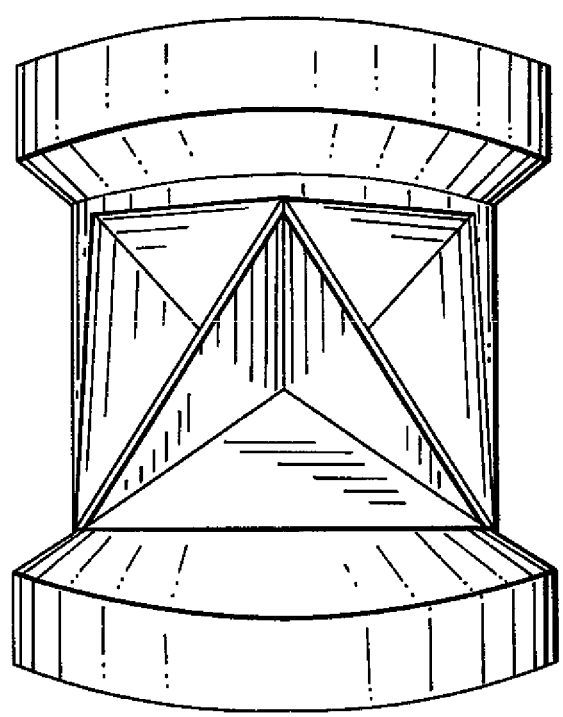
FIG. 22 shows a front view of a 360° corner cube prism.

Fixed reference points or monuments may be passive or intelligent. Passive fixed reference points or monuments may comprise a Prism or Reflector, a printed bar code or graphic, cross-hair targets or even nails. An example of a Passive Monument is shown in FIG. 22 as a Prism having an imprinted bar code.

While the present invention has been described in detail and with reference to specific embodiments thereof, it will be apparent to those skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A system for automatically generating an N-dimensional graphical representation of a multidimensional space comprising boundaries in real time, wherein N is an integer equal to or greater than 2, said system comprising a robotic master station and at least one substation, wherein both the robotic master station and said at least one robotic substation occupy positions in the multidimensional space, and wherein:
   a) the robotic master station further comprises:
      i) an electronic processor component comprising hardware, and firmware or software, and configured to measure or scan distances relative to the robotic master station in all N-dimensions using triangulation in order to determine the location of the robotic master station and the at least one robotic substation as well as objects and structures within the multidimensional space and the boundaries of the multidimensional space, wherein said objects, structures and boundaries have no physical or electronic connection to the robotic master station;
      ii) an electronic component configured to measure or scan distances relative to the robotic master station in all N-dimensions using triangulation in order to determine the location of references, specified points, objects, or structures within the multidimensional space, wherein said references, specified points objects or structures have no physical or electronic connection to the robotic master station;
      iii) a master station transmitter and receiver equipment configured to communicate with the at least one robotic substation and to precisely measure distances and to identify locations of various points within the multidimensional space relative to the robotic master station, wherein the transmitter and receiver are able to transmit and receive wireless radio signals or optical signals or both;
      iv) a master station sensor configured to detect wireless radio signals or optical signals or both that are:
         transmitted by the at least one robotic substation;
         reflected by the at least one robotic substation; or
         reflected from a structure within the multidimensional space or a fixed reference point within the structure;
      v) a first software or firmware enabled controller component configured to control movements of the robotic master station;
      vi) a second software or firmware enabled controller component configured to identify and control the at least one substation by communicating with the at least one robotic substation, instructing the at least one robotic substation to perform desired tasks, movements, and precise measurements, and to communicate with the robotic master station;
   b) the at least one robotic substation further comprises:
      i) a substation transmitter and receiver configured to communicate with the robotic master station and other substations;
      ii) a substation sensor configured to detect optical signals that are:
         transmitted from the robotic master station;
         transmitted from other substations; or
         reflected from a structure within the multidimensional space or a fixed reference point within the structure;
      iii) a substation controller configured to control movement of the robotic substation and components therein.

2. The system of claim 1 further comprising a plurality of robotic substations.

3. The system of claim 1 further comprising at least one passive device that reflects signals from the robotic master station or the at least one robotic substation.

4. The system of claim 3, further comprising a plurality of passive devices.

5. The system of claim 3 wherein the at least one passive device and the at least one robotic substation are integrated to form a unitary device comprising two components wherein the at least one robotic substation component transmits reference point information to the robotic master station or another robotic substation, and the at least one passive device component reflects signals from another device taken from the group consisting of the robotic master station, another robotic substation, another passive device, and a structure or object within the multidimensional space.

6. The system of claim 3 wherein the at least one passive device is transportable.

7. The system of claim 3 wherein the passive device further comprises a prismatic target.

8. The system of claim 7 where the passive device transmits its identification in a signal that is received by the robotic master station.

9. The system of claim 3 wherein the passive device further comprises a self-leveling laser device that assists the passive device to level itself.

10. The system of claim 1 wherein the robotic master station further comprises tools for performing tasks.

11. The system of claim 1 wherein the at least one robotic substation further comprises tools for performing tasks.

12. The system of claim 1 wherein the robotic master station is transportable.

13. The system of claim 12 wherein the robotic master station is capable of movement that is controlled as desired by reception of electronic signals or execution of pre-programmed instructions.

14. The system of claim 1 wherein the at least one robotic substation is transportable.

15. The system of claim 14 wherein the at least one robotic substation is capable of movement that is controlled as desired by reception of electronic signals or execution of pre-programmed instructions.

16. The system of claim 1 wherein points and locations within the multidimensional space measured and identified by the robotic master station are transferred onto the N-dimensional space graphical representation that is configured for display so as to allow a user operating the robotic master station to determine his or her position within the multidimensional space or to navigate or to be guided within the multidimensional space by viewing the graphical representation.

17. The system of claim 16 wherein the graphical representation is generated using computer aided design software.

18. The system of claim 1 comprising a plurality of robotic master stations.

19. The system of claim 18 wherein any robotic master station of the plurality of robotic master stations can function as a robotic substation.

20. The system of claim 19 wherein the robotic master station functioning as a robotic substation further comprises a prismatic target capable of reflecting a laser beam back to its origin.

21. The system of claim 1 wherein the robotic master station emits a beam of laser light that impinges on a target and reflects back from the target to form a reflection, and said robotic master station receives and processes the reflection to measure the distance from the robotic master station to the target.

22. The system of claim 21 wherein the beam of laser light is emitted from horizontal and vertical spinning lasers.

23. The system of claim 22 wherein the robotic master station further comprises a prismatic target.

24. The system of claim 21 wherein the laser directs laser beams in the downward direction thereby enabling the robotic master station to determine its own elevation for the purpose of triangulation.

25. The system of claim 1 wherein the robotic substation comprises a robot arm that further comprises a prismatic target and a laser.

26. The system of claim 25 further comprising a toolbox containing tools that would fit on the robot arm.

27. The system of claim 1 further comprising an accelerometer cluster that additionally comprises a plurality of accelerometers coupled to a housing containing supporting circuitry and mechanics for the cluster.

28. The system of claim 27 further comprising a computer that additionally comprises a display.

29. The system of claim 28 further comprising a prismatic device.

30. The system of claim 1 further comprising gyroscopic stabilizers.

* * * * *